(12) United States Patent
Kistler et al.

(10) Patent No.: US 11,447,075 B2
(45) Date of Patent: Sep. 20, 2022

(54) MODULES FOR CARGO AREA OF PICKUP TRUCK

(71) Applicant: Ford Global Technologies, LLC, Dearborn, MI (US)

(72) Inventors: William J. Kistler, Detroit, MI (US); Santiago Bonilla Véliz, Mexico City (MX); Srinath Vijayakumar, Farmington, MI (US); Ed Wilson, Livonia, MI (US); Keith Daugherty, Redford, MI (US); Dawn Piechocki, Grosse Pointe Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 225 days.

(21) Appl. No.: 17/001,758

(22) Filed: Aug. 25, 2020

(65) Prior Publication Data

US 2022/0063507 A1 Mar. 3, 2022

(51) Int. Cl.
| | |
|---|---|
| *B60R 9/06* | (2006.01) |
| *B62D 33/023* | (2006.01) |
| *B60R 9/02* | (2006.01) |
| *B62D 33/027* | (2006.01) |
| *B60R 11/00* | (2006.01) |
| *B62D 33/03* | (2006.01) |

(52) U.S. Cl.
CPC ............... *B60R 9/065* (2013.01); *B60R 9/02* (2013.01); *B62D 33/0273* (2013.01); *B60R 2011/004* (2013.01); *B62D 33/023* (2013.01); *B62D 33/03* (2013.01)

(58) Field of Classification Search
CPC .. B60R 9/06; B60R 9/065; B60R 9/02; B60R 2011/004; B62D 33/0273; B62D 33/023; B62D 33/027; B62D 33/03
USPC ....................................................... 296/37.6
See application file for complete search history.

(56) References Cited

U.S. PATENT DOCUMENTS

| | | | | |
|---|---|---|---|---|
| 2,784,027 | A * | 3/1957 | Temp ........................ | B60P 3/32 296/156 |
| 5,398,987 | A * | 3/1995 | Sturgis ...................... | B60R 9/00 224/404 |
| 6,003,923 | A * | 12/1999 | Scott ........................ | B60R 11/06 296/37.6 |
| 6,139,080 | A * | 10/2000 | Saffold ..................... | B60R 9/00 292/145 |
| 6,814,397 | B2 * | 11/2004 | Henderson .............. | B62D 33/02 296/181.3 |
| 7,070,227 | B2 * | 7/2006 | Hunt ................... | B62D 33/0273 296/183.1 |
| 7,431,368 | B2 * | 10/2008 | Henderson ......... | B62D 33/0273 296/37.6 |
| 7,651,146 | B2 | 1/2010 | Anderson et al. | |
| 9,120,510 | B1 | 9/2015 | Gillam et al. | |
| 9,193,290 | B2 * | 11/2015 | Lazarevich ............... | B60P 3/14 |
| 9,694,754 | B2 * | 7/2017 | Sterling .................... | B60R 5/04 |

(Continued)

*Primary Examiner* — Gregory A Blankenship
(74) *Attorney, Agent, or Firm* — Vichit Chea; Carlson, Gaskey & Olds, P.C.

(57) ABSTRACT

This disclosure relates to various modules for use relative to a cargo area of a pickup truck. The modules are configured to provide the cargo area with additional functionality, such as providing a storage compartment or a support for one or more electronic components. The cargo area can be customized by mounting specific modules at one of a number of predetermined locations within the cargo area.

14 Claims, 7 Drawing Sheets

(56) References Cited

U.S. PATENT DOCUMENTS

| | | | |
|---|---|---|---|
| 10,000,159 B2* | 6/2018 | Hellman | F25D 3/08 |
| 10,035,470 B2* | 7/2018 | Pulleyblank | B60R 9/065 |
| 10,173,603 B2* | 1/2019 | Dunham | B60R 9/065 |
| 2001/0013709 A1* | 8/2001 | Clare | B62D 33/02 |
| | | | 296/183.1 |
| 2002/0109376 A1* | 8/2002 | Gruich | B60R 9/00 |
| | | | 296/183.1 |
| 2004/0094985 A1* | 5/2004 | Mobley | B60R 9/00 |
| | | | 296/37.6 |
| 2005/0134070 A1* | 6/2005 | Plentis | B60R 9/02 |
| | | | 296/37.1 |
| 2008/0012375 A1* | 1/2008 | Steiger | B60R 11/06 |
| | | | 296/37.6 |
| 2009/0066104 A1* | 3/2009 | Duller | B60R 7/005 |
| | | | 296/37.6 |
| 2009/0189404 A1* | 7/2009 | Anderson | B60R 7/02 |
| | | | 296/37.6 |
| 2015/0129626 A1* | 5/2015 | Malin | B60R 9/065 |
| | | | 224/404 |
| 2015/0375690 A1* | 12/2015 | Beasley | B60R 9/02 |
| | | | 296/37.6 |
| 2016/0280144 A1* | 9/2016 | Hemphill | B62D 33/0207 |
| 2016/0288725 A1* | 10/2016 | Sterling | B62D 33/023 |
| 2022/0063507 A1* | 3/2022 | Kistler | B60R 9/02 |

\* cited by examiner

MODULES FOR CARGO AREA OF PICKUP TRUCK

TECHNICAL FIELD

This disclosure relates to various modules for use relative to a cargo area of a pickup truck.

BACKGROUND

Pickup trucks typically include an enclosed cab and a cargo area (or cargo box) having a bed, side walls extending along opposite sides of the bed, and a tailgate. The tailgate typically swings relative to the side walls between an upright, closed position and a horizontal, open position. When in the closed position, the tailgate typically latches to the side walls and encloses the cargo area from the rear. When the tailgate is open, a user may access the cargo area from the rear.

SUMMARY

A pickup truck according to an exemplary aspect of the present disclosure includes, among other things, a cargo area including a bed, a first side wall extending along a first side of the bed, and a second side wall extending along a second side of the bed opposite the first side. An inner surface of the first side wall facing the bed includes a first opening configured to receive a first module, and an inner surface of the second side wall facing the bed includes a second opening configured to receive a second module. The second opening is sized and shaped substantially the same as the first opening. Further, the pickup truck includes a first module configured to be mounted relative to the first opening, and a second module configured to be mounted relative to the second opening and providing different functionality than the first module.

In a further non-limiting embodiment of the foregoing pickup truck, the first module includes a first main portion arranged at least partially within the first opening and a first flange projecting from the first main portion and abutting the inner surface of the first side wall, and the second module includes a second main portion arranged at least partially within the second opening and a second flange projecting from the second main portion abutting the inner surface of the second side wall.

In a further non-limiting embodiment of any of the foregoing pickup trucks, the first module is mounted relative to the first opening via fasteners engaged with the first flange and the inner surface of the first side wall, and the second module is mounted relative to the second opening via fasteners engaged with the second flange and the inner surface of the second side wall.

In a further non-limiting embodiment of any of the foregoing pickup trucks, the first module includes one of a storage compartment, at least one electronic component, or a blank, and the second module includes another of a storage compartment, at least one electronic component, or a blank.

In a further non-limiting embodiment of any of the foregoing pickup trucks, the first module includes a bin, and a door selectively moveable between an open position in which the bin is accessible and a closed position in which the door closes the bin.

In a further non-limiting embodiment of any of the foregoing pickup trucks, the bin includes by an upper wall, a back wall, first and second side walls, and a bottom wall.

In a further non-limiting embodiment of any of the foregoing pickup trucks, the bottom wall is spaced-apart below a bottom of an opening of the bin.

In a further non-limiting embodiment of any of the foregoing pickup trucks, the first module includes an intermediate wall selectively removable from the bin and configured such that, when present in the bin, the intermediate wall is spaced-apart from the bottom wall and is configured to support objects above the bottom wall.

In a further non-limiting embodiment of any of the foregoing pickup trucks, the intermediate wall is configured to fit into the bin by insertion in one direction only.

In a further non-limiting embodiment of any of the foregoing pickup trucks, the first and second side walls of the bin include channels configured to receive respective first and second side walls of the intermediate wall, the channels in the first and second side walls of the bin are tapered in height moving toward the rear wall, and the first and second side walls of the intermediate wall are tapered in height moving toward a rear edge of the intermediate wall.

In a further non-limiting embodiment of any of the foregoing pickup trucks, the intermediate wall includes a front edge having at least one notch.

In a further non-limiting embodiment of any of the foregoing pickup trucks, the bin includes at least one drainage opening oriented along an axis non-perpendicular to a ground surface.

In a further non-limiting embodiment of any of the foregoing pickup trucks, the first module includes a knob selectively moveable to hold the door in the closed position.

In a further non-limiting embodiment of any of the foregoing pickup trucks, the second module includes a mounting panel, and at least one electronic component supported on the mounting panel.

In a further non-limiting embodiment of any of the foregoing pickup trucks, the at least one electronic component is spaced-apart from the inner surface of the second side wall in a direction opposite the bed.

In a further non-limiting embodiment of any of the foregoing pickup trucks, the mounting panel includes a first wall and a second wall inclined relative to one another, a first electronic component is supported on the first wall, and a second electronic component is supported on the second wall.

In a further non-limiting embodiment of any of the foregoing pickup trucks, the first and second electronic components are spaced-apart from the inner surface of the second side wall in the direction opposite the bed.

In a further non-limiting embodiment of any of the foregoing pickup trucks, the first electronic component is a light and the second electronic component is an electrical outlet.

A storage compartment configured to be mounted relative to an opening in an inner surface of a side wall of a cargo area of a pickup truck according to an exemplary aspect of the present disclosure includes, among other things, a bin including an upper wall, a back wall, first and second side walls, and a bottom wall, wherein the bottom wall is spaced-apart below a bottom of an opening of the bin. Further, the storage compartment includes a door selectively moveable between an open position in which the bin is accessible and a closed position in which the door closes the bin. Additionally, the storage compartment includes an intermediate wall selectively removable from the bin and configured such that, when present in the bin. The intermediate wall is spaced-apart from the bottom wall and is configured to support objects above the bottom wall. The storage compartment also includes at least one drainage opening oriented along an axis non-perpendicular to a ground surface, and a knob selectively moveable to hold the door in the closed position.

A panel configured to support at least one electronic component and configured to be mounted relative to an opening in an inner surface of a side wall of a cargo area of a pickup truck according to an exemplary aspect of the present disclosure includes, among other things, a first wall, a second wall inclined relative to the first wall, a light supported on the first wall, an electrical outlet supported on the second wall, that the light and the electrical outlet are spaced-apart from the inner surface of the side wall in a direction opposite a bed of the cargo area.

DETAILED DESCRIPTION

This disclosure relates to various modules for use relative to a cargo area of a pickup truck. The modules are configured to provide the cargo area with additional functionality, such as providing a storage compartment or support for one or more electronic components. The cargo area can be customized by mounting specific modules at one of a number of predetermined locations within the cargo area. These and other benefits will be appreciated from the below description.

Figure 1:
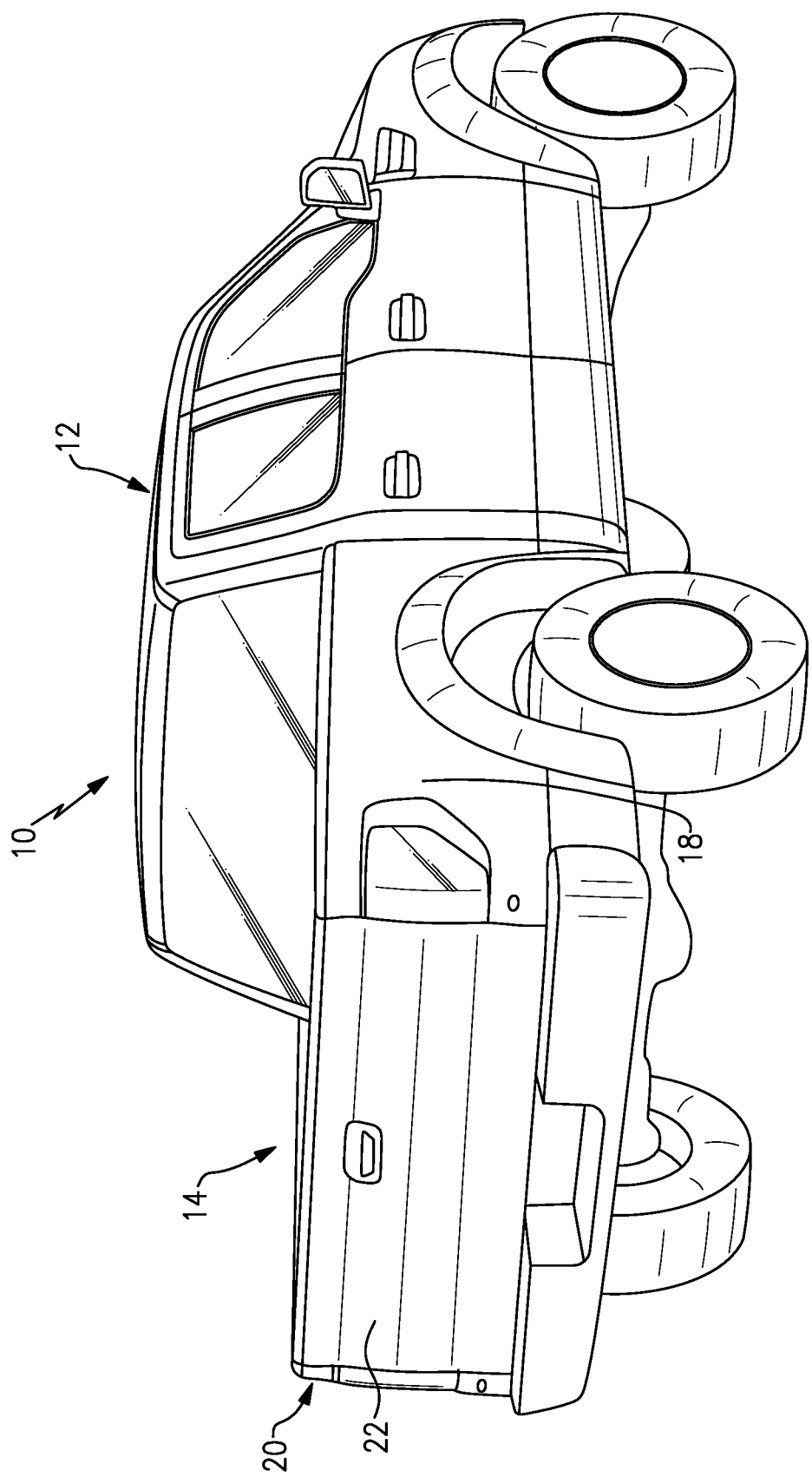
FIG. 1 is a rear-perspective view of a motor vehicle, which in this example is a pickup truck.

FIG. 1 illustrates a motor vehicle 10, which in this example is a pickup truck. While particularly beneficial in the context of pickup trucks, this disclosure could extend to other vehicles besides pickup trucks. The vehicle 10 includes a passenger cabin 12 and, rearward of the passenger cabin 12, a cargo area 14. The cargo area 14 is an open-topped cargo area in this example. In other examples, the cargo area 14 can be closed by a moveable cover, such as a tonneau cover, or a fixed cover, such as a truck cap.

The cargo area 14 includes bottom surface, or bed 16 (FIGS. 2-4, 8), a first sidewall 18 extending along a first side of the bed 16, a second side wall 20 extending along a second side of the bed 16 opposite the first side of the bed 16, and tailgate 22. In FIG. 1, the tailgate 22 is in a closed position. The tailgate 22 is configured to swing relative to the side walls 18, 20 between the upright, closed position of FIG. 1 and a substantially horizontal, open position. When in the closed position, the tailgate 22 is latched to the side walls 18, 20 and encloses the cargo area 14 from the rear. When open, a user may access to the cargo area 14 from the rear.

This disclosure relates to one or more modules that can be mounted relative to the cargo area 14, thereby providing the cargo area 14 with additional functionality. Example modules will be discussed below. The modules may include electronic, mechanical, and/or electromechanical components. The cargo area 14 can include one or more of the below-discussed modules.

Figure 2:
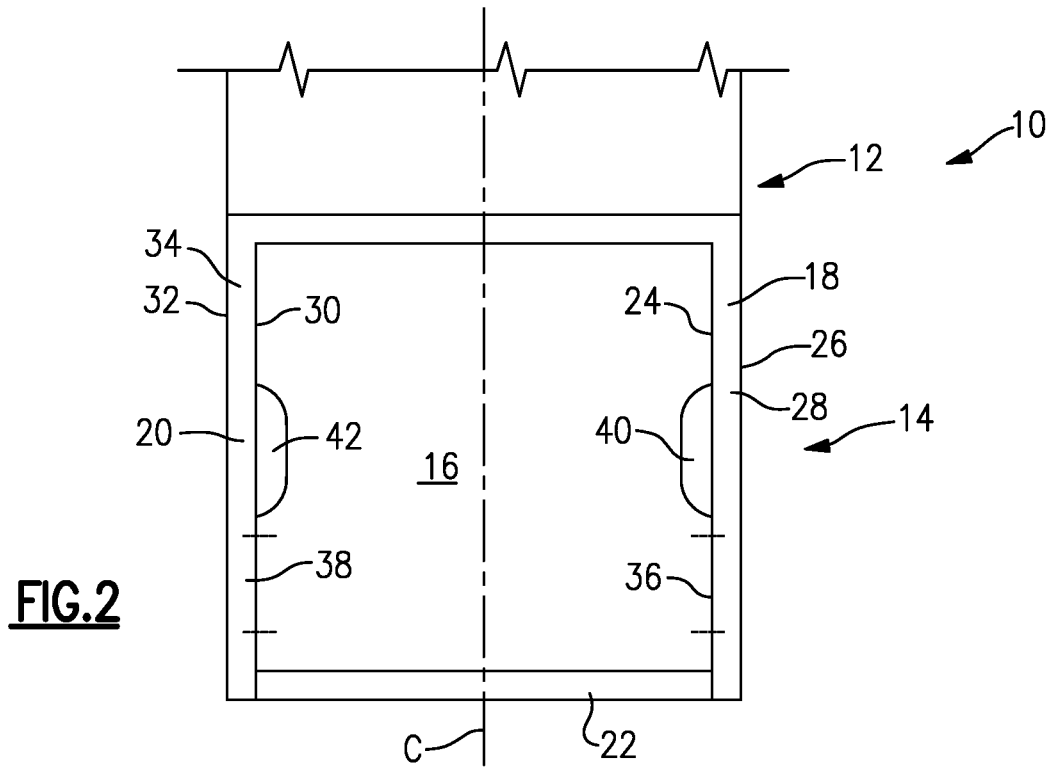
FIG. 2 is a somewhat schematic top view of the pickup truck, and in particular schematically illustrates openings in the cargo area configured to receive modules.

FIG. 2 schematically illustrates a portion of the vehicle 10, and in particular illustrates the cargo area 14, from a top view. As shown in FIG. 2, the first side wall 18 includes an inner surface 24 facing a centerline C of the vehicle 10 and the bed 16, an outer surface 26, and a cavity, or space, 28 between the inner and outer surfaces 24, 26. The second side wall 20 also includes an inner surface 30 facing the centerline C of the vehicle 10 and the bed 16, an outer surface 32, and a cavity 34 between the inner and outer surfaces 30, 32. In this example, the inner surfaces 24, 30 of the first side wall 18 and the second side wall 20 include respective first and second openings 36, 38. The openings 36, 38 are schematically illustrated using dashed lines in FIG. 2. The openings 36, 38 are sized and shaped substantially similarly in this example. The openings 36, 38 may be rectangular. In a further example, the openings 36, 38 are square. In one particular example, the openings 36, 38 are about 200 mm in height and 200 mm in width.

In the example of FIG. 2, the openings 36, 38 are arranged rearward of (i.e., toward the tailgate 22) first and second wheel wells 40, 42. The openings 36, 38 could be placed in other locations. That said, there are benefits, including ease of access, to locating the openings 36, 38 adjacent the tailgate 22. While two openings are shown in FIG. 2, the cargo area 14 could include additional or fewer openings. Further, the cargo area 14 could include a single opening configured to receive more than one module. For instance, an opening could be approximately 200 mm in height and 400 mm in width and receive two modules.

Figure 3:
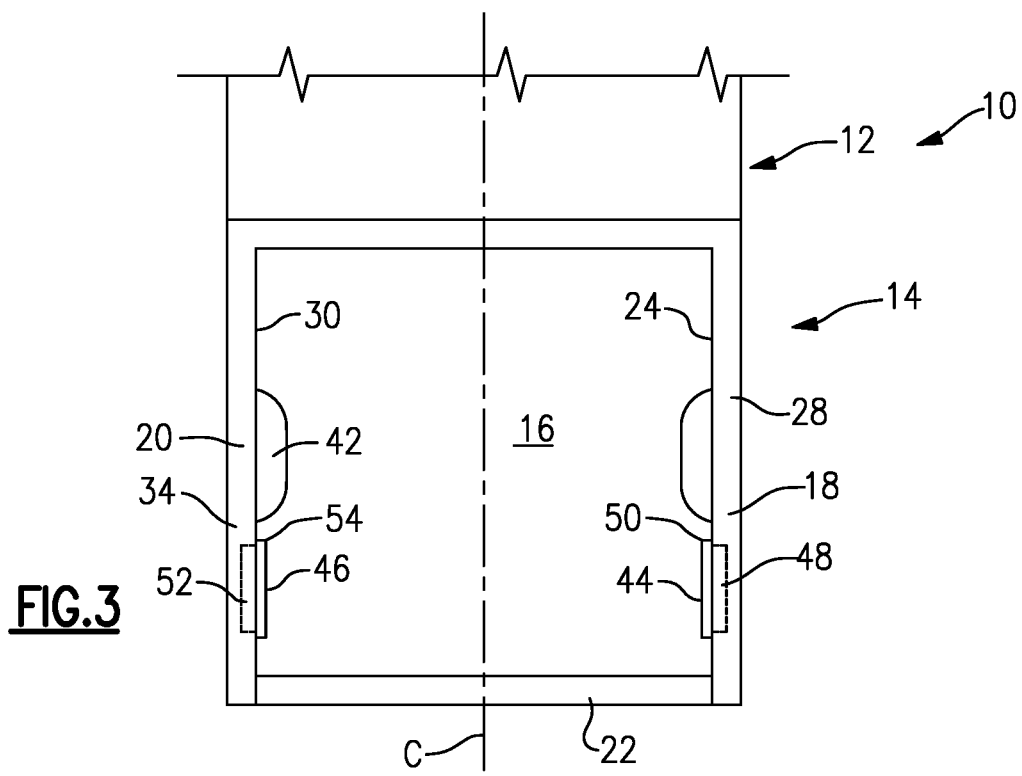
FIG. 3 is a somewhat schematic top view of the pickup truck similar to FIG. 2, and in particular schematically illustrates modules mounted relative to the openings in the cargo area.

In FIG. 3, a first module 44 is mounted relative to the first opening 36, and a second module 46 is mounted relative to the second opening 38. The first and second modules 44, 46 provide different functionality from one another, in one example. Example modules include a storage compartment, a panel supporting at least one electronic component (such as a light and/or outlet), an air hose, an air compressor, and a blank (i.e., a plate covering the opening so as to not expose the opening and corresponding cavity to the elements). While some examples have been listed, other types of modules come within the scope of this disclosure. The storage compartment and panel supporting at least one electronic component will be discussed below.

When mounted relative to the openings 36, 38, main portions of the first and second modules 44, 46 project at least partially into the corresponding cavities 28, 34 of the first and second walls 18, 20, whereas a flange abuts the inner surfaces 24, 30 to facilitate fastening the first and second modules 44, 46 to the inner surfaces 24, 30. In particular, relative to FIGS. 2-3, the first module 44 includes a first main portion 48 arranged at least partially within the first opening 36 and the cavity 28, and further includes a first flange 50 projecting from the first main portion 48 and abutting the inner surface 24. Likewise, the second module 46 includes a second main portion 52 arranged at least partially within the second opening 38 and the cavity 34, and a second flange 54 projecting from the second main portion 52 abutting the inner surface 30. Fasteners, such as bolts, screws, etc., are used to fasten the first flange 50 to the inner surface 24 and the second flange 54 to the inner surface 30. The inner surfaces 24, 34 and flanges 50, 54 could include predefined holes arranged in a similar pattern, for example, such that either the first or second module 44, 46 could be mounted relative to either opening 36, 38.

Figure 4:
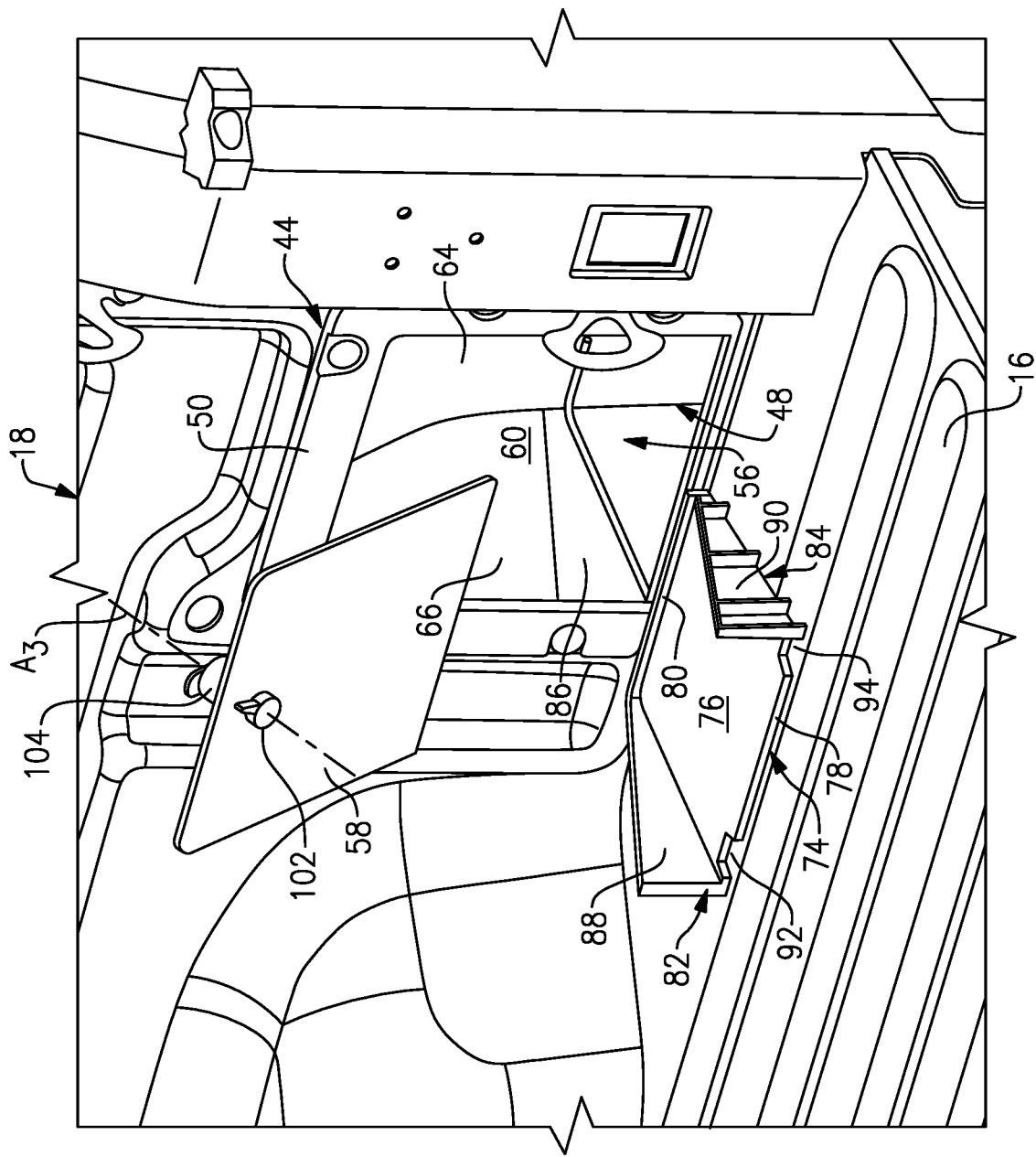
FIG. 4 is a perspective, exploded view of a portion of the cargo area and a storage compartment.

FIG. 4 illustrates additional detail of the first module 44 configured as a storage compartment. In particular, in FIG. 4, the first main portion 48 includes components which provide the first module 44 with the functionality of a storage compartment. For instance, the first module 44 includes a bin 56 and a door 58 selectively moveable between an open position in which the bin 56 is accessible via an opening 60 facing the bed 16 and a closed position in which the door 58 closes the bin 56. The door 58 is shown in an exploded view in FIG. 4 but in this example would be hingedly connected adjacent a bottom of the opening 60, adjacent the bed 16. In another example, the door 58 is not hingedly connected to the bin 56, but is rather fully removable from the bin 56. In this example, FIG. 4 is representative of the manner in which a user would remove the door 58 from the bin 56.

Figure 5:
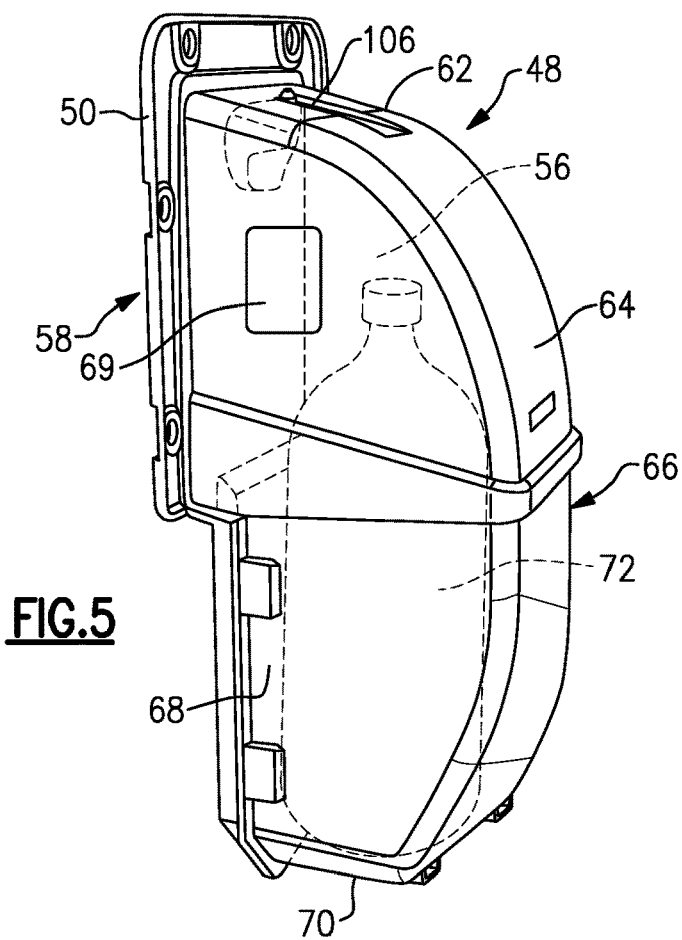
FIG. 5 is a rear perspective view of the storage compartment.

With reference to FIG. 5, the bin 56 includes by an upper wall 62, a back wall 64 extending downward from the upper wall 62, first and second side walls 66, 68 extending from the upper wall 62 and the back wall 64, and a bottom wall 70. The bottom wall 70, in this example, is spaced-apart below a bottom edge of the opening 60. About half the volume of the bin 56 is below the opening 60. In this way, relatively large or uniquely shaped objects, such as a 2-liter bottle 72, can fit in the bin 56. Element 69 is an access indicator formed in the side wall 68. The access indicator 69, in an example, indicates that a user can remove this portion of the side wall 68 and, if the user does so, the user can access a power supply hidden behind the side wall 68. This may be useful in embodiments where the user wishes to customize the module to provide power to a component in or adjacent the bin 56.

Figure 6:
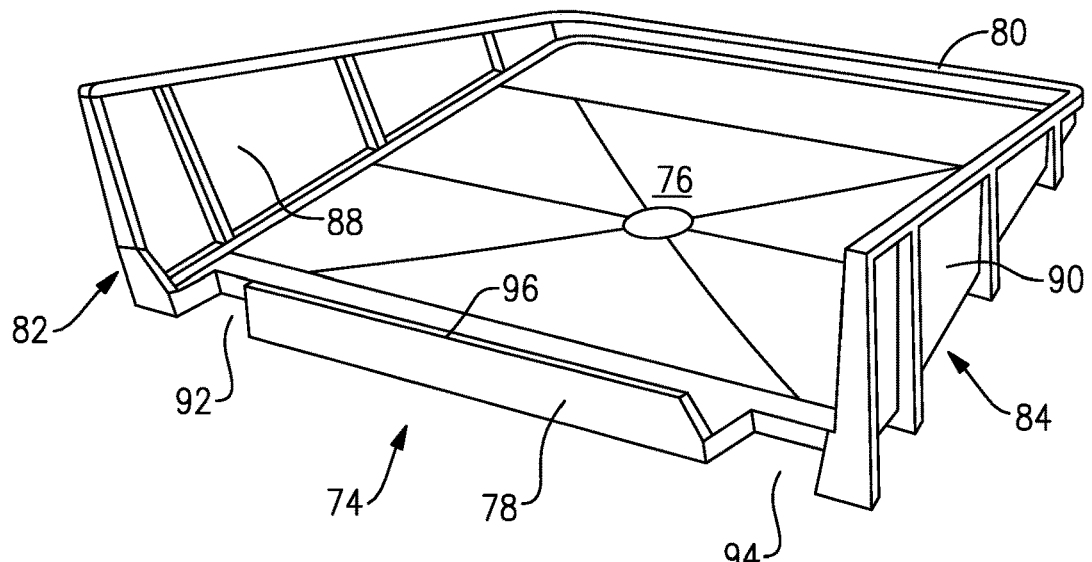
FIG. 6 is a perspective view of an intermediate wall configured for use with the storage compartment.

With reference to FIGS. 4 and 6, an intermediate wall 74 can be inserted into the bin 56 to essentially provide the bin 56 with a smaller storage volume, making it easier to access smaller objects placed within the bin 56. The intermediate wall 74, in this example, includes a main portion 76 extending between a front edge 78, rear edge 80, and opposed first and second sides 82, 84.

The intermediate wall 74 is configured to fit into the bin 56 by insertion in one direction only, namely by leading with the rear edge 80. This aspect of this disclosure prevents one from inserting the intermediate wall 74 into the bin 56 in the incorrect direction. In this disclosure, the first and second side walls 66, 68 of the bin 56 include channels configured to receive corresponding first and second side walls of the intermediate wall. An example channel 86 formed in the first side wall 66 is visible in FIG. 4. While not visible, a corresponding channel is formed in the second side wall 68. The channel 86 is tapered in height (i.e., gradually reduces in height) moving toward the rear wall 64 of the bin. Further, the intermediate wall 74 includes first and second side walls 88, 90 projecting upward from respective first and second sides 82, 84 by heights that taper moving toward the rear edge 80. The tapered channels and the side walls prevents insertion of the intermediate wall 74 in an incorrect direction.

Further, the intermediate wall 74 includes at least one notch, and in this example includes two notches 92, 94, recessed inward from the front edge 78 thereof to receive corresponding downward projections of the door 58, such as tabs projecting from a bottom edge of the door 58 that hold the door 58 in place relative to the lower edge of the opening 60 when the door 58 is closed. To assist with removal of the intermediate wall 74, a lip 96 projects upward from the front edge 78. The lip 96 is not present in all examples. Specifically, the lip 96 is present in FIG. 6 but not in FIG. 4. Further, the intermediate wall 74 may include reinforcing ribs to increase its strength.

Figure 7:
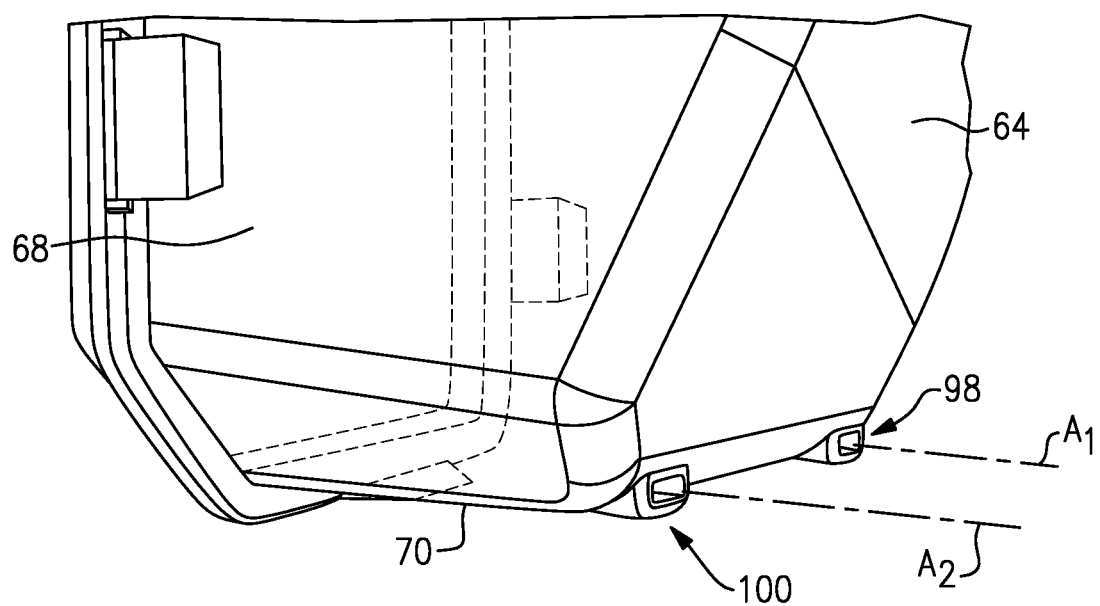
FIG. 7 is a rear perspective view of a bottom portion of the storage compartment, and in particular illustrates drainage openings.

The bin 56 further includes at least one drainage opening. As shown in FIG. 7, the bin 56 includes first and second drainage openings 98, 100 formed in the rear wall 64 adjacent the intersection between the rear wall 64 and the bottom wall 70. The first and second drainage openings 98, 100 are configured to permit fluid in the bin 56 to drain into the cavity 28 and out the vehicle 10. To prevent fluid from entering the first and second drainage openings 98, 100, such as fluid splashing up from the ground as the vehicle 10 travels along a road, the first and second drainage openings 98, 100 are oriented about respective central axes $A_1$, $A_2$, which are non-perpendicular to a ground surface and non-parallel to the direction of the force gravity. In this example, the axes $A_1$, $A_2$ extend in a direction substantially parallel to a ground surface and perpendicular to the direction of the force due to gravity. If the axes $A_1$, $A_2$ were parallel to the ground surface, for example, splashing fluid may more readily enter the bin 56. In another example, the axes $A_1$, $A_2$ are substantially parallel but tipped slightly downward so that water drains out the openings 98, 100. In yet another example, one-way valves are mounted relative to the openings 98, 100 to permit drainage but prevent splashing fluid from entering.

Additionally, the door 58 may include a knob configured to selectively hold the door 58 in the closed position. In FIG. 4, the door 58 includes an opening 102 configured to receive a knob 104. The knob 104 is configured to selectively engage a corresponding structure, which in this example is a slot 106 formed in an upper wall 62 of the bin 56, to hold the door 58 in the closed position. The knob 104, in particular, is configured to rotate about axis $A_3$ within a range of about 90° to selectively engage and disengage the slot 106. In this example, the knob 104 is not lockable. However, in other examples, the knob 104 may include a lock, such as a pin tumbler lock, which is selectively unlocked using a key. Alternatively, a user may replace the knob 104 with a custom lock cylinder to provide the door 58 with lockability.

Figure 8:
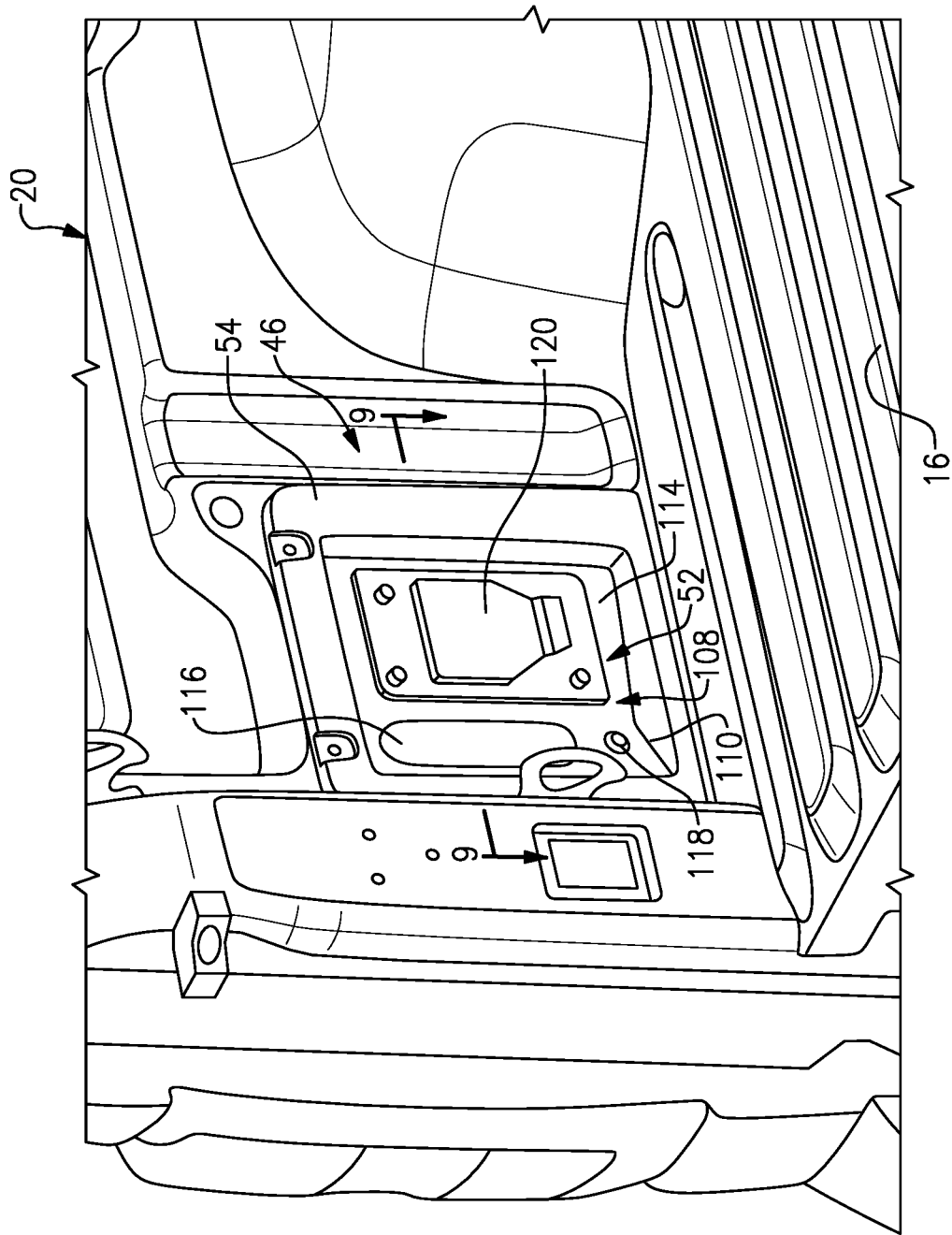
FIG. 8 is a perspective view of a portion of the cargo area and a panel supporting electronic components.
Figure 9:
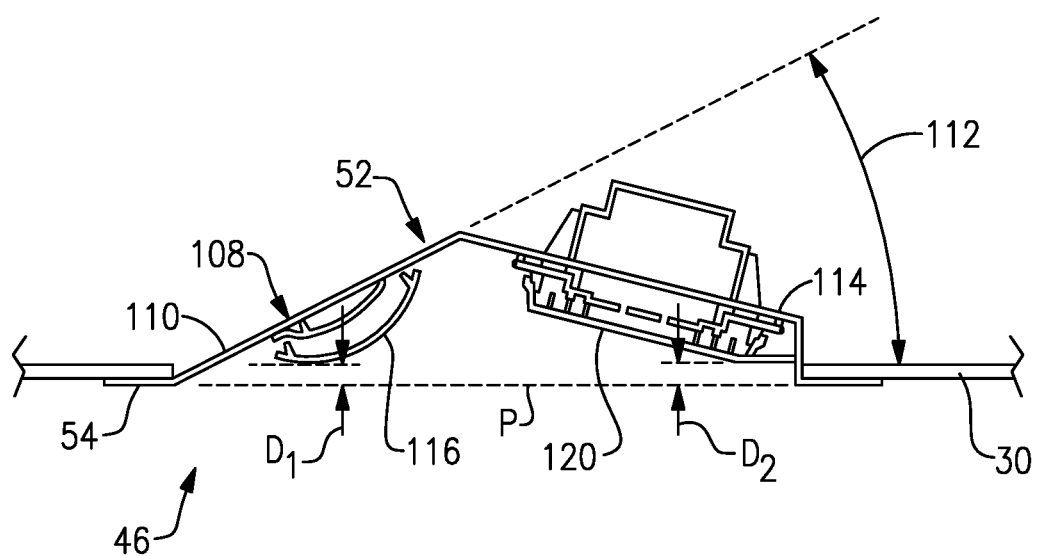
FIG. 9 is a cross-sectional view taken along line 9-9 in FIG. 8.

FIGS. 8 and 9 illustrate additional detail of the second module 46 when configured as a panel supporting at least one electronic component. Specifically, the second main portion 52 includes a mounting panel 108 positioned in the second opening 38, and at least one electronic component supported on the mounting panel 108. The mounting panel 108 may be formed of a polymer material, as sheet metal, for example, may be difficult to form into the below-discussed shapes.

In this example, the mounting panel 108 includes a first panel portion 110. The first panel portion 110 is provided by a substantially flat wall inclined away from the bed 16 by a first acute angle 112, which is about 25 degrees in this example. The angle 112 is measured relative to the inner surface 30 when facing a front of the vehicle 10. The mounting panel 108 further includes a second panel portion 114 provided by a substantially flat wall and connected to the first panel portion 110 at its furthest point away from the bed 16. The second panel portion 114 is inclined relative to the first panel portion 110 at a non-90° angle in this example. The first panel portion 110 is inclined such that it faces toward a front of the vehicle 10, whereas the second panel portion 114 faces toward the rear of the vehicle 10.

The first panel portion 110 support two electronic components, in this example. Specifically, the first panel portion 110 supports a light 116, such as an LED light, and a switch or button 118 configured to selectively activate the light 116. The second panel portion 114, in this example, supports an electrical outlet 120, or plug, such as a 120 Volt power outlet. Arranging the light 116 on the first panel portion 110, which faces the front of the vehicle 10, effectively spreads the light emitted from the light 116 throughout the bed to provide enhanced visibility of the bed 16. Arranging the electrical outlet 120 toward the rear of the vehicle 10 provides a user with increased ease of access to the electrical outlet 120.

To protect the electronic components, the electronic components 116, 118, 120 are supported on the mounting panel 108 such that they are recessed inward of a plane P the flange 54 and inner surface 30. In particular, the light 116 is spaced-apart from the plane P by a distance $D_1$ and the electrical outlet 120 is spaced-apart from the plane P by a distance $D_2$. The distances $D_1$ and $D_2$ extend from the plane P in a direction opposite the bed 16. The distances $D_1$, $D_2$ may be the same distance or different distances.

It should be understood that terms such as "about," "substantially," and "generally" are not intended to be boundaryless terms, and should be interpreted consistent with the way one skilled in the art would interpret those terms. Further, directional terms such as "rear," "front," "top," "bottom," "side," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A pickup truck, comprising:
a cargo area including a bed, a first side wall extending along a first side of the bed, and a second side wall extending along a second side of the bed opposite the first side, wherein an inner surface of the first side wall facing the bed includes a first opening configured to receive a first module, and wherein an inner surface of the second side wall facing the bed includes a second opening configured to receive a second module, wherein the second opening is sized and shaped substantially the same as the first opening;
a first module configured to be mounted relative to the first opening, wherein the first module includes:
a bin including an upper wall, a back wall, first and second side walls, and a bottom wall, wherein the bottom wall is spaced-apart below a bottom of an opening of the bin,
a door selectively moveable between an open position in which the bin is accessible and a closed position in which the door closes the bin; and
an intermediate wall selectively removable from the bin and configured such that, when present in the bin, the intermediate wall is spaced-apart from the bottom wall and is configured to support objects above the bottom wall, wherein the intermediate wall is configured to fit into the bin by insertion in one direction only; and
a second module configured to be mounted relative to the second opening and providing different functionality than the first module.

2. The pickup truck as recited in claim 1, wherein:
the first module includes a first main portion arranged at least partially within the first opening and a first flange projecting from the first main portion and abutting the inner surface of the first side wall, and
the second module includes a second main portion arranged at least partially within the second opening and a second flange projecting from the second main portion abutting the inner surface of the second side wall.

3. The pickup truck as recited in claim 2, wherein:
the first module is mounted relative to the first opening via fasteners engaged with the first flange and the inner surface of the first side wall, and
the second module is mounted relative to the second opening via fasteners engaged with the second flange and the inner surface of the second side wall.

4. The pickup truck as recited in claim 1, wherein:
the first and second side walls of the bin include channels configured to receive respective first and second side walls of the intermediate wall,
the channels in the first and second side walls of the bin are tapered in height moving toward the back wall, and
the first and second side walls of the intermediate wall are tapered in height moving toward a rear edge of the intermediate wall.

5. The pickup truck as recited in claim 1, wherein the intermediate wall includes a front edge having at least one notch.

6. The pickup truck as recited in claim 1, wherein the bin includes at least one drainage opening oriented along an axis non-perpendicular to a ground surface when the door is in both the open position and the closed position.

7. The pickup truck as recited in claim 1, wherein the first module includes a knob selectively moveable to hold the door in the closed position.

8. The pickup truck as recited in claim 1, wherein the second module includes:
a mounting panel, and
at least one electronic component supported on the mounting panel.

9. The pickup truck as recited in claim 8, wherein:
the at least one electronic component is spaced-apart from the inner surface of the second side wall in a direction opposite the bed.

10. The pickup truck as recited in claim 9, wherein:
the mounting panel includes a first wall and a second wall inclined relative to one another,
a first electronic component is supported on the first wall, and a second electronic component is supported on the second wall.

11. The pickup truck as recited in claim 10, wherein the first and second electronic components are spaced-apart from the inner surface of the second side wall in the direction opposite the bed.

12. The pickup truck as recited in claim 10, wherein the first electronic component is a light and the second electronic component is an electrical outlet.

13. A storage compartment configured to be mounted relative to an opening in an inner surface of a side wall of a cargo area of a pickup truck, comprising:
   a bin including an upper wall, a back wall, first and second side walls, and a bottom wall, wherein the bottom wall is spaced-apart below a bottom of an opening of the bin;
   a door selectively moveable between an open position in which the bin is accessible and a closed position in which the door closes the bin;
   an intermediate wall selectively removable from the bin and configured such that, when present in the bin, the intermediate wall is spaced-apart from the bottom wall and is configured to support objects above the bottom wall;
   at least one drainage opening oriented along an axis non-perpendicular to a plane containing a bed of the cargo area; and
   a knob selectively moveable to hold the door in the closed position.

14. A panel configured to support at least one electronic component and configured to be mounted relative to an opening in an inner surface of a side wall of a cargo area of a pickup truck, comprising:
   a first wall;
   a second wall inclined relative to the first wall;
   a light supported on the first wall;
   an electrical outlet supported on the second wall; and
   wherein the light and the electrical outlet are spaced-apart from the inner surface of the side wall in a direction opposite a bed of the cargo area.

\* \* \* \* \*